US012024926B2

(12) United States Patent
Caines et al.

(10) Patent No.: US 12,024,926 B2
(45) Date of Patent: Jul. 2, 2024

(54) FOOT-OPERATED SYSTEMS AND DEVICES FOR HANDLESS OPERATION OF A DOOR

(71) Applicant: Aztech Industrial Devices LLC, Carlsbad, CA (US)

(72) Inventors: Marcus A. Caines, San Diego, CA (US); Theodore Tillinghast, Vista, CA (US); Clarke A. Caines, Carlsbad, CA (US)

(73) Assignee: Aztech Industrial Devices LLC, Carlsbad, CA (US)

(*) Notice: Subject to any disclaimer, the term of this patent is extended or adjusted under 35 U.S.C. 154(b) by 0 days.

(21) Appl. No.: 17/522,789

(22) Filed: Nov. 9, 2021

(65) Prior Publication Data

US 2022/0154494 A1 May 19, 2022

Related U.S. Application Data

(60) Provisional application No. 63/113,699, filed on Nov. 13, 2020.

(51) Int. Cl.
*E05B 53/00* (2006.01)
*E05F 13/02* (2006.01)

(52) U.S. Cl.
CPC ............ *E05B 53/001* (2013.01); *E05F 13/02* (2013.01)

(58) Field of Classification Search
CPC ............................... E05B 53/001; E05F 13/02
See application file for complete search history.

(56) References Cited

U.S. PATENT DOCUMENTS

| | | | | |
|---|---|---|---|---|
| 1,583,818 | A | 5/1926 | White | |
| 1,603,722 | A * | 10/1926 | Stanley | E05B 53/001 292/255 |
| 2,741,504 | A | 4/1956 | Dale | |
| 4,569,546 | A | 2/1986 | Howard et al. | |
| 4,621,848 | A | 11/1986 | Pierce | |
| 5,217,265 | A * | 6/1993 | Lerner | E05B 37/163 292/196 |
| 5,725,263 | A * | 3/1998 | Rodriguez | E05C 17/48 292/342 |
| 6,176,042 | B1 * | 1/2001 | Rossman | E06B 9/04 49/57 |
| 6,360,488 | B1 * | 3/2002 | Darling | E05F 13/02 49/274 |

(Continued)

FOREIGN PATENT DOCUMENTS

| | | |
|---|---|---|
| CN | 211598112 U | 9/2020 |
| DE | 202020101984 U1 | 4/2020 |

(Continued)

*Primary Examiner* — Mark A Williams

(74) *Attorney, Agent, or Firm* — Sheppard Mullin Richter & Hampton LLP

(57) ABSTRACT

Systems, devices, and methods are provided herein for handless operation of a door. For example, a system is disclosed having a foot pedal assembly configured to be disposed at a bottom edge of the door, the foot pedal assembly configured to generate a signal, and a push-lock assembly configured to attach to a door handle external to a mounting rose of the door handle, the push-lock assembly configured to receive the signal from the foot pedal assembly and translate the signal into rotational movement configured to operate the door handle.

13 Claims, 15 Drawing Sheets

(56) References Cited

U.S. PATENT DOCUMENTS

| | | | | |
|---|---|---|---|---|
| 7,270,352 | B1 * | 9/2007 | Stuart | E05B 1/0053 292/336.3 |
| 7,788,954 | B2 * | 9/2010 | Schumm | E05C 17/48 292/41 |
| 8,707,622 | B1 * | 4/2014 | Neustel, Jr. | E05F 13/02 49/263 |
| 8,745,922 | B1 * | 6/2014 | Matsuda | E05C 19/006 49/269 |
| 8,888,149 | B2 | 11/2014 | Lehr | |
| 9,347,252 | B2 | 5/2016 | Klein | |
| 2007/0256362 | A1 | 11/2007 | Hansen | |
| 2013/0118085 | A1 * | 5/2013 | Hedemark | F16H 21/44 49/504 |
| 2013/0318882 | A1 * | 12/2013 | Booker | E05C 17/44 292/343 |
| 2014/0353985 | A1 | 12/2014 | Klein | |
| 2015/0020454 | A1 * | 1/2015 | Klein | E05F 11/54 49/267 |
| 2017/0218661 | A1 | 8/2017 | Fraychineaud, Jr. | |
| 2019/0128022 | A1 * | 5/2019 | Markway | E05B 17/22 |

FOREIGN PATENT DOCUMENTS

| | | | | |
|---|---|---|---|---|
| EP | 1048811 | A1 | 11/2000 | |
| EP | 1889990 | A2 * | 2/2008 | E05B 1/0053 |
| WO | 2016037600 | A1 | 3/2016 | |

* cited by examiner

FOOT-OPERATED SYSTEMS AND DEVICES FOR HANDLESS OPERATION OF A DOOR

RELATED APPLICATIONS

This application claims priority to U.S. Provisional Patent Application No. 63/113,699, filed on Nov. 13, 2020, which is hereby incorporated herein by reference as if set forth in full.

BACKGROUND

Technical Field

This disclosure relates to hands free operation of a door. More specifically, this disclosure relates to foot operated devices and systems that provide for operation of the door, without the need for a user to interact with a door knob or handle.

Description of the Related Art

In a world impacted by the spread of infectious disease, door knobs and handles are among the dirtiest, most used surfaces within homes, restaurants, and bathrooms. Once the knob or handle is contaminated, each user thereafter opening or closing the door encounters the risk of being infected and contracting a cold, flu, coronavirus, or other diseases. Contamination is best avoided by careful hand washing; however, many people using public facilities exhibit less than exemplary hygiene and either inadequately wash their hands or fail to wash them altogether. As a result, unsanitary and contaminated door knobs and handles continue to be an health concern.

The present disclosure is directed toward overcoming the problems identified above.

SUMMARY

A system comprising a door handle assembly and foot pedal assembly designed for contactless usability when opening/closing your latched door. The design is simple to use and can help anyone get through any door with ease. The design makes it so opening a latched door can be done without using one's hands, thus mitigating risk of spreading bacteria. The ability to open latched doors this way will be most beneficial to hospitality and industrial businesses that require their employees/doctors to sterilize multiple times throughout the day.

In an example aspect, a hands free door operation device for operating a door is provided. The device comprising a door operating assembly coupled to a door handle and configured to operate a door responsive to a foot of a user. The device also comprises a foot pedal assembly positioned at a bottom region of the door, the foot pedal assembly physically coupled to or communicatively coupled to the door operating assembly and configured to receive an interaction with a foot of a user and cause the door operating assembly to operate the door, wherein operating the door comprises either operate the door handle to open the door or operate a locking mechanism of the door to unlock the door, having requiring the user use a hand to operate the door.

In some embodiments, the foot pedal assembly may include a knurled surface, a housing, and an actuating mechanism within the housing. When the knurled surface is pressed by the foot of the user, the knurled surface actuates the actuating mechanism. The door operating assembly may be a push-lock mechanism physically coupled to the door handle and to the actuating mechanism of the foot pedal assembly, wherein actuation of the actuating mechanism causes the door operating assembly to either operate the door handle to open the door or operate a locking mechanism of the door to unlock the door.

In some embodiments, alone or in combination with other embodiments, the door handle may be installed in the door prior to being coupled to the door operating assembly, wherein the operating member and foot pedal assembly are attached thereto without removing the door handle from the door.

In some embodiments, along or in combination with other embodiments, the foot pedal assembly comprises a motion sensor configured to detect the presence of the foot of the user via motion of the foot, the foot pedal assembly is configured to transmit a signal indicative of the detection to the door operating assembly, and wherein, in response to receiving the signal from the foot pedal assembly, the door operating assembly is configured to operate the door under control of a computing device.

In some aspects, a system for hands free operation of a door is provided. The system includes an arm member having an upper end and a lower end and a foot pedal assembly disposed at the lower end of the arm member. The foot pedal assembly includes a first planar member having an upper end that receives the lower end of the arm member, a foot pedal rotatably coupled to the upper end of the first planar member at an upper end of the foot pedal, and a plurality of linkage components rotatably coupled to a lower end of the foot pedal and coupled to the arm member. The system also includes a door handle assembly disposed at the upper end of the arm member, the door handle assembly comprising a first component coupled to the upper end of the arm and a second component configured to attach to a spindle of the door handle external to a mounting rose of the door handle. Operation of the foot pedal applies a translational movement to the door handle assembly via the arm member, and the first and second components translate the translational movement to a rotational movement that operates the door.

In some aspects, a foot pedal apparatus for operating a door handle assembly for hands free operation of a door is provided. The foot pedal apparatus includes a bracket having a first planar member, and a second planar member extending approximately perpendicular from the first planar member. The apparatus also includes a foot pedal rotatably coupled to the first planar member at a first pivot point and extending from the first pivot point toward the second planar member, and a plurality of linkage components configured to translate a force applied to the foot pedal into a translation movement transmitted to the door handle assembly. The plurality of linkage components includes a first linkage component slidably coupled to the first planar member, and a second linkage component extending from the first linkage component to the foot pedal, the second linkage component coupled to the first linkage component at a second pivot point and coupled to the food pedal at a third pivot point.

In some aspects, a system for hands free operation of a door is provided. The system includes a foot pedal assembly configured to be disposed at a bottom edge of the door, the foot pedal assembly configured to generate a signal; and a push-lock assembly configured to attach to a door handle external to a mounting rose of the door handle, the push-lock assembly configured to receive the signal from the foot pedal assembly and translate the signal into rotational movement configured to operate the door handle.

Other advantages and benefits of the disclosed system and methods will be apparent to one of ordinary skill with a review of the following description.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DESCRIPTION

Figure 1:
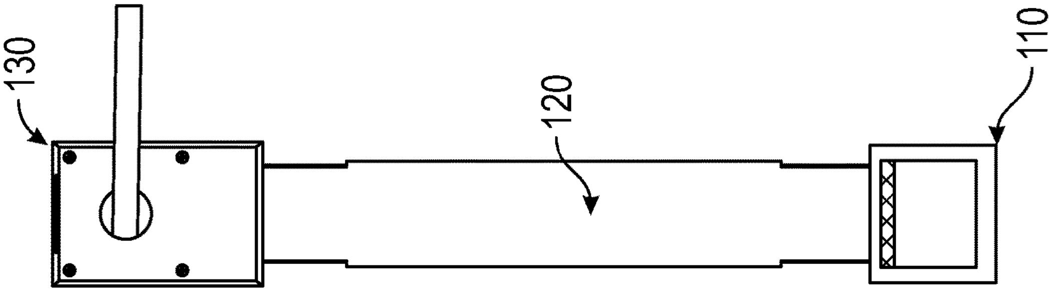
FIG. 1 is a schematic representation of an embodiment of a system for handless operation of a door according to various embodiments.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

References throughout this specification to one/an "implementation", "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present disclosure is directed to door handles and foot pedals designed for contactless usability when opening/closing a latched door. Embodiments herein provide a system for handless operation of a door that are configured to attach to an existing door handle assembly. For example, a push-lock mechanism can be attached to a handle of a latch door handle assembly on door, and configured to operate (e.g., turn) the handle in response to operating a foot pedal coupled to the push-lock mechanism, without the need of the user to grasp or otherwise turn the handle using their hand. Upon operating the foot pedal, according to some embodiments, a push-lock mechanism may be employed to open an unlatched door, for example, by exerting converting an upward translational force to a rotational force that rotates the door handle to unlatch and open the door. Alternatively, a pulling force may also be applied to the push-lock mechanism that may open the door.

The design is simple to use and can help anyone get through any door with ease. The design makes it so opening a latched door can be done without using one's hands, thus mitigating risk of spreading bacteria. The ability to open latched doors this way will be most beneficial to hospitality and industrial businesses that require their employees/doctors to sterilize multiple times throughout the day.

Another benefit of the embodiment disclosed herein is opening doors when one's hands are full. There's nothing worse than loading up your arms with groceries, laundry, or whatever it may be and realizing you've forgot to open the door beforehand. Embodiments disclosed herein provide for operating a door without hands. Furthermore, embodiments herein also make it easier for children, or those who may not be able to reach a door handle, to open doors.

Some embodiments herein comprise a knurled surface on the foot pedal that allows for optimal grip when opening/closing a latched door. Additionally, embodiments herein are easy to install on any door way because the embodiments disclosed herein fit to any doorway seamlessly. To assemble, one may install the door handle as normally, push the self-locking mechanism into the bottom of the door handle (e.g., external to the mounting rose along the spindle), do the same with the foot pedal assembly, and finally attach the foot pedal assembly to the bottom of the door for stability. Once complete, the foot pedal assembly will supply the capability that the door handle would, and may lock with the door handle.

FIG. 1 is a schematic drawing of an example system 100 for handless operation of a door (not shown). System 100 comprises a foot pedal assembly 110 and communication medium 120 (sometimes referred to herein as an arm member). The communication medium 120 is coupled to the foot pedal assembly 110 and a door handle assembly 130, which comprises a push-lock mechanism (sometimes referred to herein as a door operating assembly).

Figure 2:
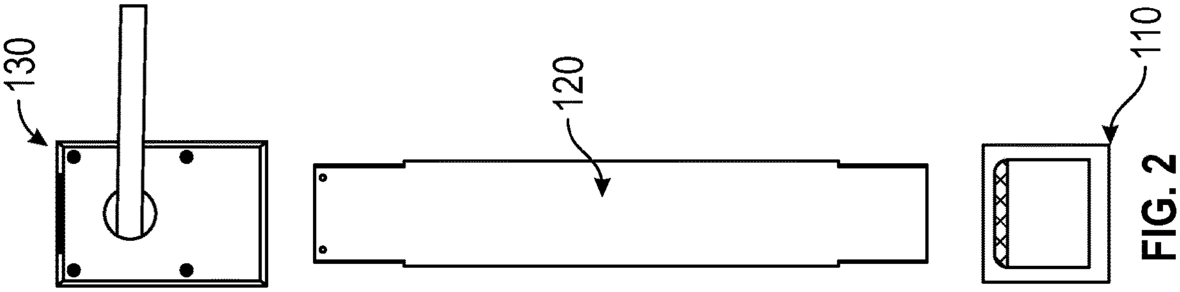
FIG. 2 is an exploded view of the schematic representation of the system for handless operation of a door of FIG. 1.

FIG. 2 is a schematic drawing of an exploded view the system 100.

In the embodiment shown in FIGS. 1 and 2, the door handle need not be disassembled to install the push-lock mechanism. The communication medium 120 may be attached to the door handle via the door handle assembly 130, in accordance with the embodiments disclosed herein. Thus, the system 100 may be connected to an existing door handle assembly 130. In an example embodiment, the door handle assembly 130 is attached to a door handle as shown in FIGS. 1 and 2. However, the embodiments disclosed throughout this disclosure may be applied to not only door handles, but also door knobs and any type of devices for operating door latch.

The communication medium 120 may include a plate of material, rod of material, a wire, or any medium that physically couples to the foot pedal assembly 110, that, upon operation of the foot pedal assembly 110, operates the door handle assembly 130 to unlatch the door. The user may then move their foot at the foot pedal assembly 110 to open and/or close the door.

Figure 5:
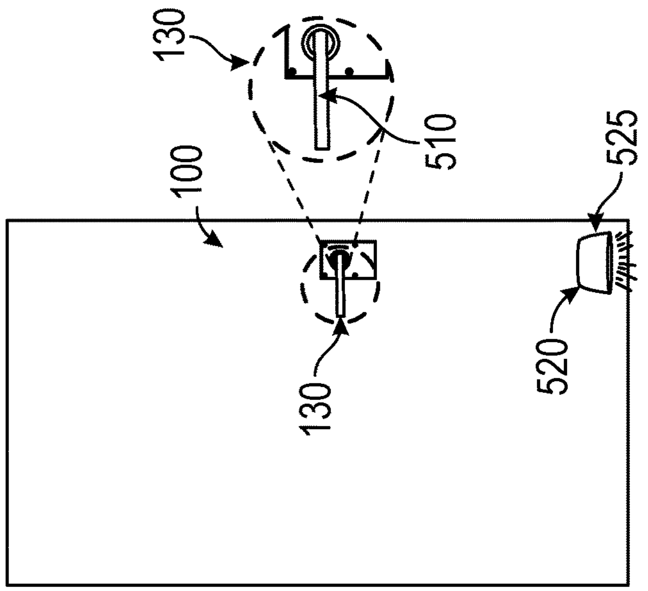

In operation, the foot pedal assembly 110 may be configured for foot actuation to generate a signal, which is communicated to the door handle assembly 130 via the communication medium 120. The door handle assembly 130 converts the signal to rotational movement to operate door handle. Thus, there is no need for a user to contact the door handle itself (e.g., by grasping the handle). In some examples, the generated signal is a translational force that is received at the door handle assembly 130 as a translational movement via the communication medium 120. The door handle assembly 130 then converts the translational movement to rotational movement. In another example, the signal may a communicated via a wired or wireless signal indicating that a foot has been detected, which is communicated via the communication medium (e.g., wired or wireless communication mediums) as electrical or wireless signals to the door handle assembly 130 (FIG. 5). The door handle assembly 130 may receive the signal and generate the rotational movement accordingly.

Figure 3:
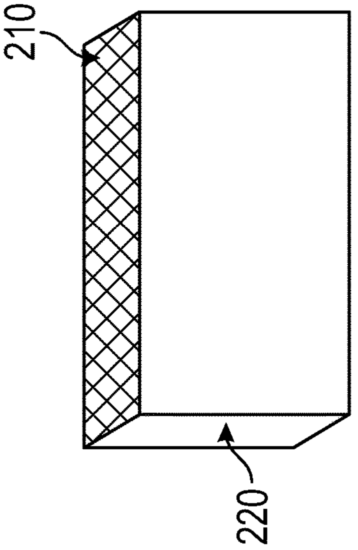
FIG. 3 is a schematic representation of an embodiment of a foot pedal assembly according to various embodiments.
Figure 4:
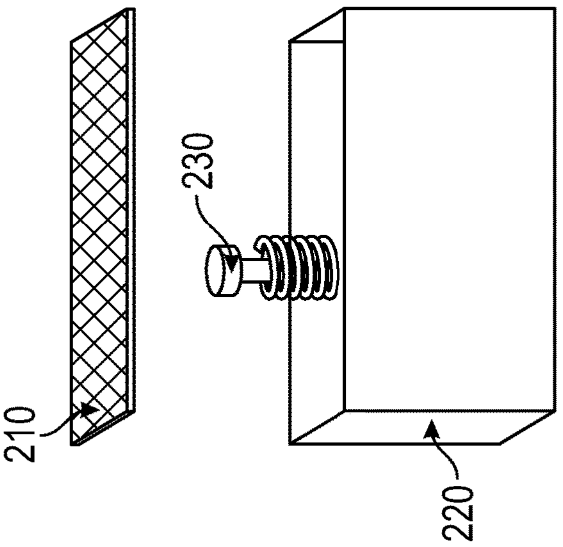
FIG. 4 is an exploded view of the schematic representation of the foot pedal assembly of FIG. 2.

FIGS. 3 and 4 are schematic drawings of an example foot pedal assembly 110 of FIG. 1. The foot pedal assembly 110 may include a knurled top surface (or pedal) 210 and a housing 220 including operating mechanism therein.

FIG. 4 illustrates an exploded view of the foot pedal assembly 110 of FIG. 1. The foot pedal assembly 110 comprises operating mechanisms 230 arranged within the housing 220. In the example of FIG. 3, the operating mechanism 230 is a pressure or spring mechanism that is depressed upon operation of the knurled top surface (or pedal) 210. The operating mechanism 230 is an example of an actuating mechanism. The operating mechanism then interacts with the communication medium 120 to operate the door handle assembly 130 as described above. In some embodiments, the operating mechanism 230 is a mechanical mechanism as shown in FIG. 4. In other embodiments, the operating mechanism 230 may be electrical, such that operation of the foot pedal assembly 110 causes a signal to be transmitted (through a wired or wireless connection) that operates the door handle.

Some embodiments may also comprise a wheel (not shown) on the backside of the housing (e.g., the side closest to the door) or on a bottom surface of the housing. The wheel may be configured to connect with the floor before excessive force is applied to the pedal assembly which may overload the pedal assembly and cause breakage.

FIG. 5 is a schematic drawing of an example automated implementation of system 100. The automated implementation includes a component 510 attached to the door handle assembly 130. In the example implementation, the component 510 is attached internally to the door handle assembly 130. Operation of foot pedal assembly 110 communicates a signal to the component 510, which operates the door handle assembly 130. The system of FIG. 5 may be coupled to, for example, a computing system 2100 for processing signals and automated operation of the door handle assembly 130. In this example, communication medium may be a wired or wireless communication for exchanging electrical signals or wireless signals between component 510 and foot pedal assembly 110.

In FIG. 5, in some examples, the foot pedal assembly 110 may be replaced with an alternative foot pedal assembly 520, which detects the presence of a foot in an automated fashion and then operates the component 510. For example, foot pedal assembly 520 may detect the foot via one or more sensors 525. Sensors 525 may be one or more of motion sensors, pressure sensors, photoelectric sensors, thermal sensors, radar technology, object recognition from imaging devices such as cameras, infrared detectors, acoustic sensors, vibration sensors, etc. Thus, the user's foot need not contact the foot pedal assembly 520.

Figure 6:
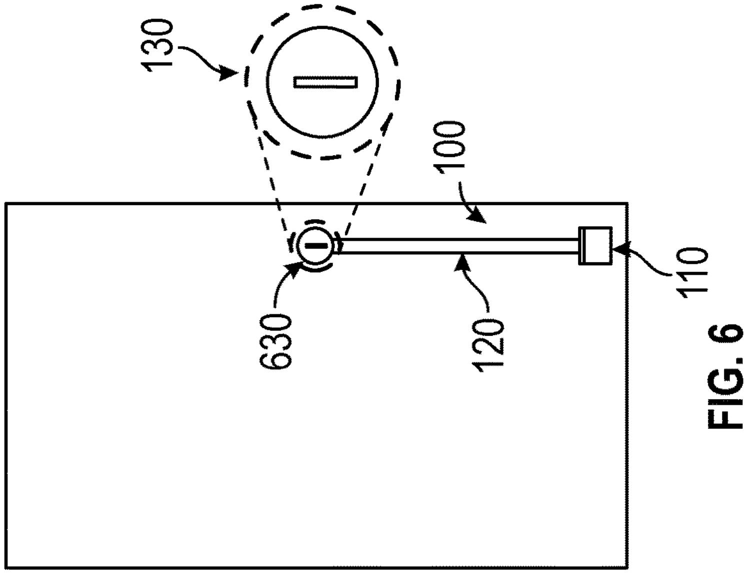

FIG. 6 is a schematic drawing of the system 100 where the push-lock mechanism 130 is coupled to a locking mechanism 630 of the door. In a manner similar to that described above, operation of the foot pedal assembly 110 causes the push-lock mechanism 130 to operate the locking mechanism 630 to lock and/or unlock the door.

Figure 7:
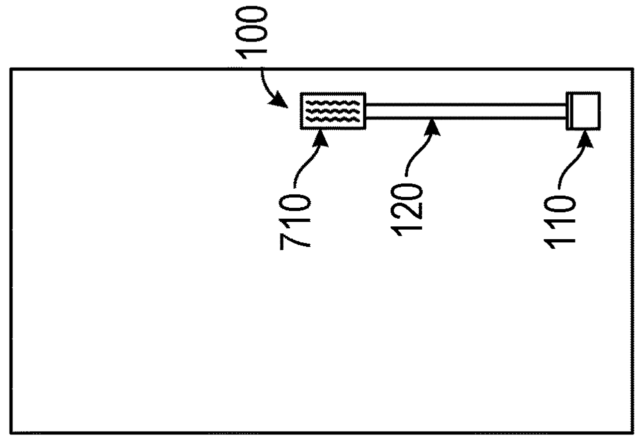
FIGS. 5-7 are schematic representations of various examples of system for handless operation of a door according to various embodiments.

FIG. 7 is a schematic drawing of system 100 configured for use with an electronic key receiver 710 (e.g., key fobs or cards utilizing short radio frequency communications to operate a locking mechanism of the door). In this example, an electronic key is able to lock/unlock the door via wireless communication with the receiver 710, while the foot pedal assembly 110 is configured to operate the latch as described herein.

Some embodiments may utilize only a foot pedal assembly. For example, where the door does not have a locking mechanism, the foot pedal assembly may be utilized to open and close the door without requiring the user to utilize his/her hands.

Figure 8:
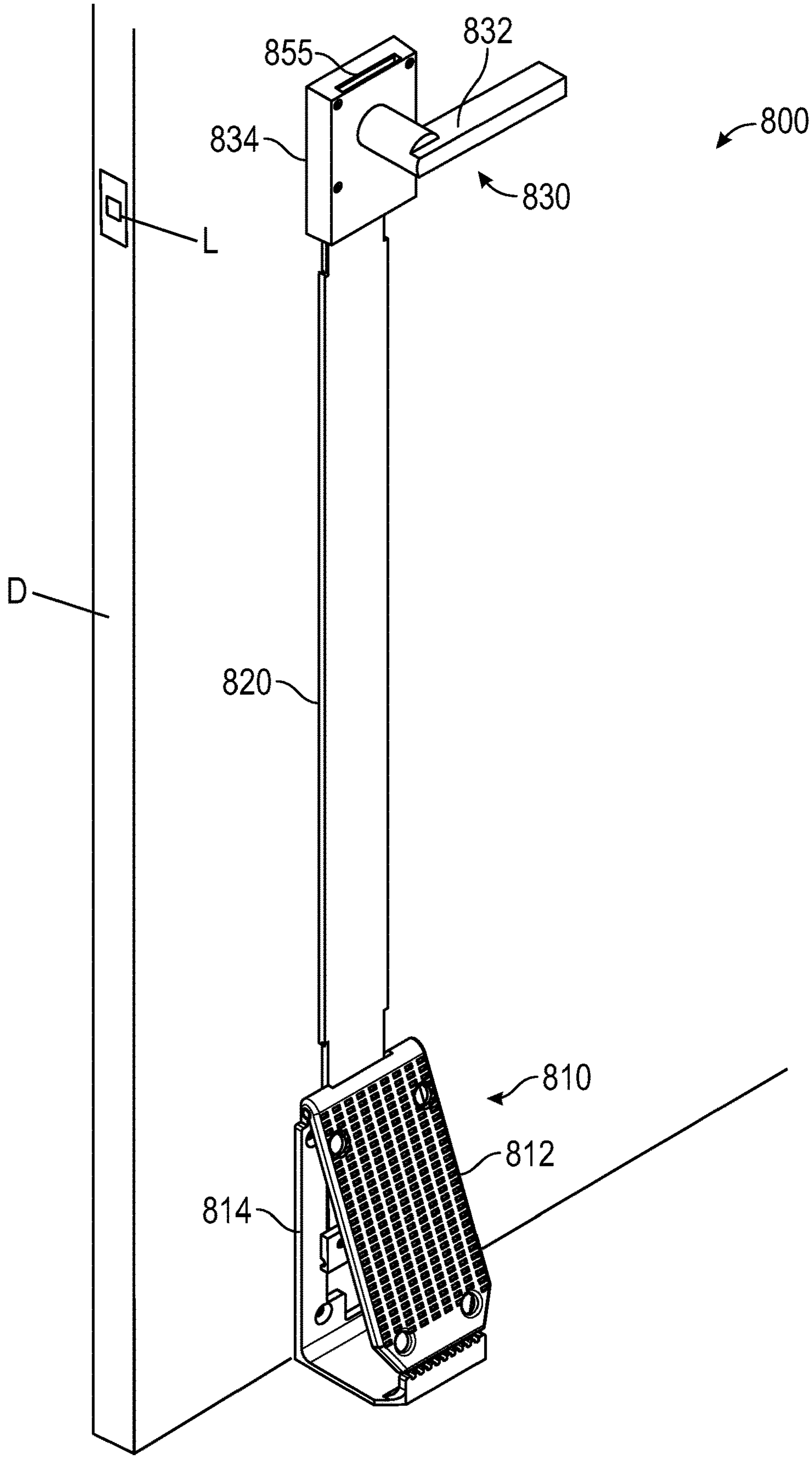
FIG. 8 is a schematic graphical representation of another example of a system for handless operation of a door in a first state according to various embodiments.
Figure 9:
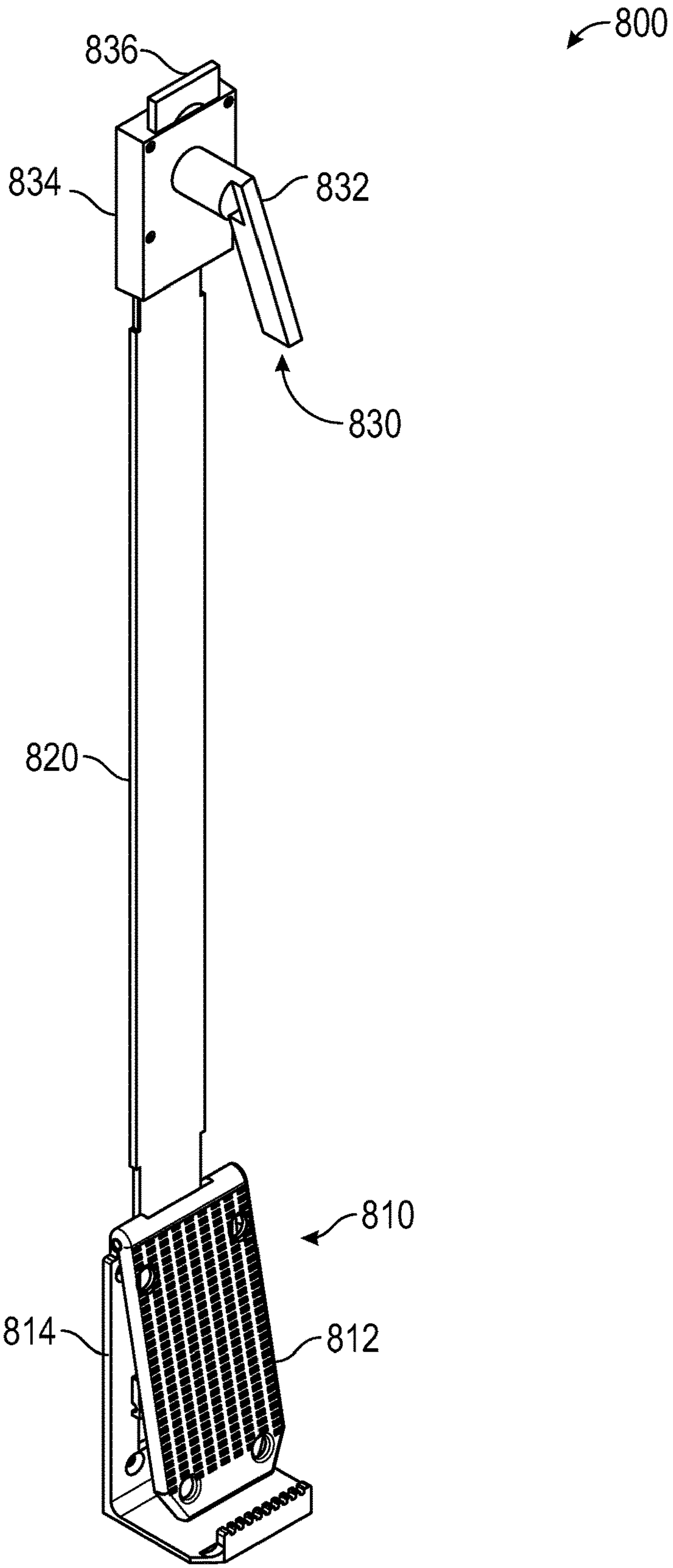
FIG. 9 is a schematic graphical representation of the example system of FIG. 8 in a second state according to various embodiments.

FIGS. 8 and 9 are schematic graphical representations of a system 800 for handless operation of a door D having a latch L according to various embodiments. System 800 may be similar to the system 100. The system 800 includes a foot pedal assembly 810, a door handle assembly 830, and a communication medium. In the illustrative examples of FIGS. 8 and 9, the communication medium is an arm member 820 that is physically coupled to the door handle assembly 830 at upper end and the foot pedal assembly 810 at a lower end. The arm member 820 is configured to communicate a translational force from the foot pedal assembly 810 into translational movement applied to the door handle assembly 830. The foot pedal assembly 810 may be configured for foot actuation causing a rotational force, which the foot pedal assembly 810 converts to the translational force that is applied to the lower end of the arm member 820. The arm member 820 then communicates the translational force to the door handle assembly as translational movement. The door handle assembly converts the translation movement to rotational movement to operate door handle 832. Thus, there is no need for a user to contact the door handle itself (e.g., by grasping the handle).

FIG. 8 illustrates the system 800 in a first position or state, for example, in closed state. The closed position may refer to a resting state, for example, when the door is not currently operated by a user and the latch (not shown) of the door handle is engaged with the door. FIG. 9 illustrates the system, with the door removed, in a second position or state, for example, a opened position. The opened state may refer to a user engaged or user operating state and the system is engaged to open the door such that the latch is no longer engaged with the door. The opened state may be a result of user engagement or operation with the foot pedal assembly 810.

Figure 10:
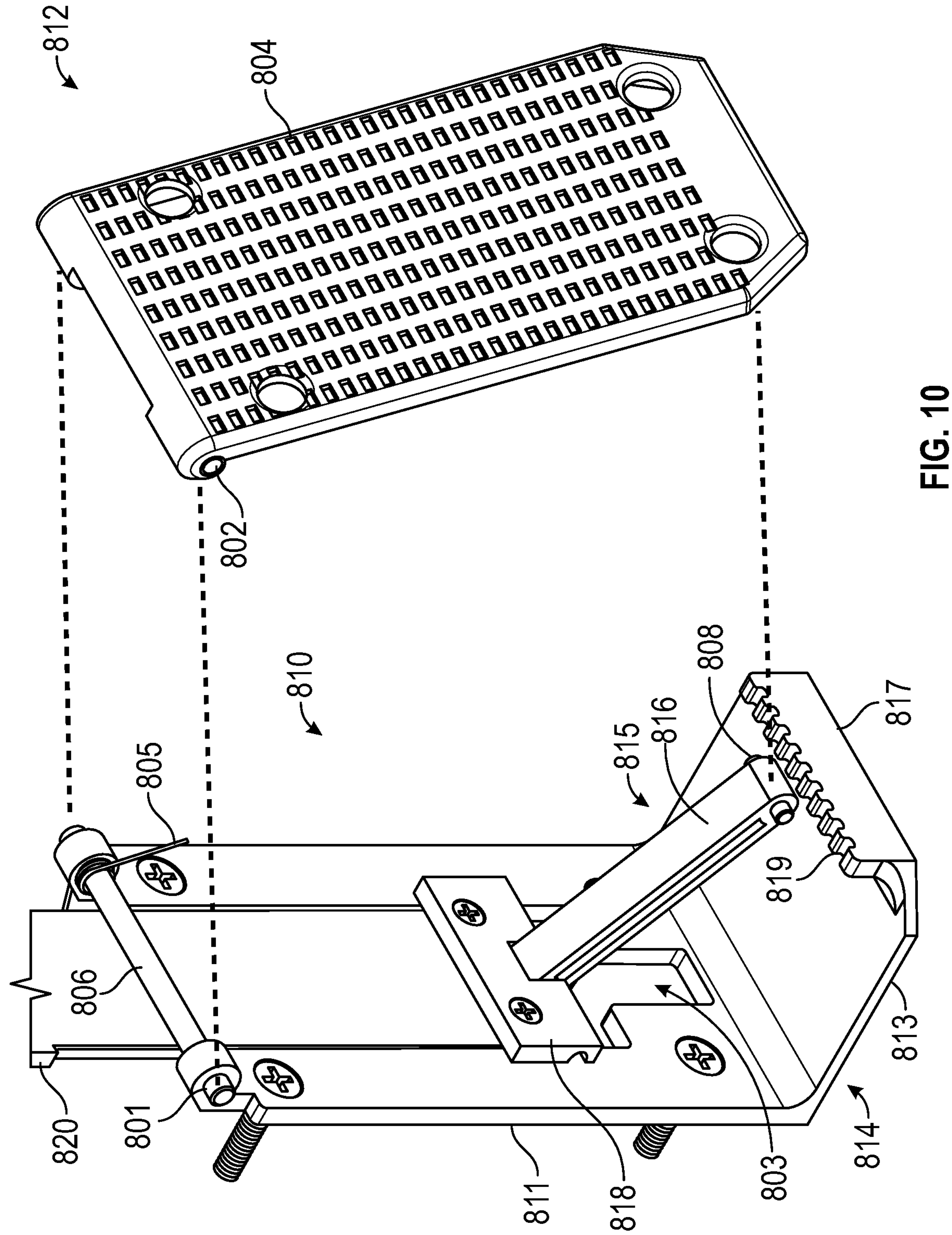
FIG. 10 is an exploded view of a schematic graphical representation of an example foot pedal assembly, included as part of the system of FIG. 8, in the first state according to various embodiments.
Figure 11:
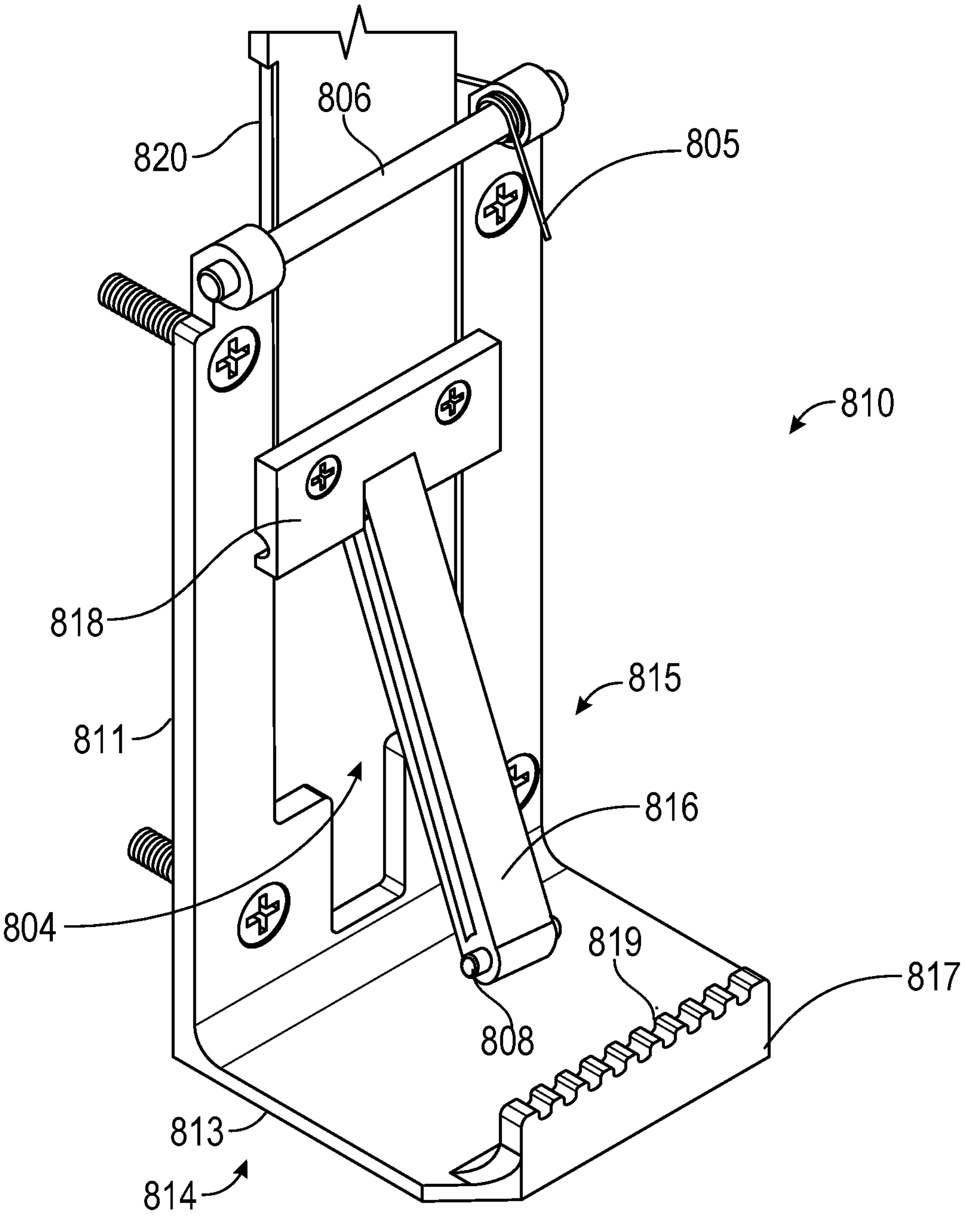
FIG. 11 is an exploded view of a schematic graphical representation of an example foot pedal assembly of FIG. 10 in the second state according to various embodiments.
Figure 12:
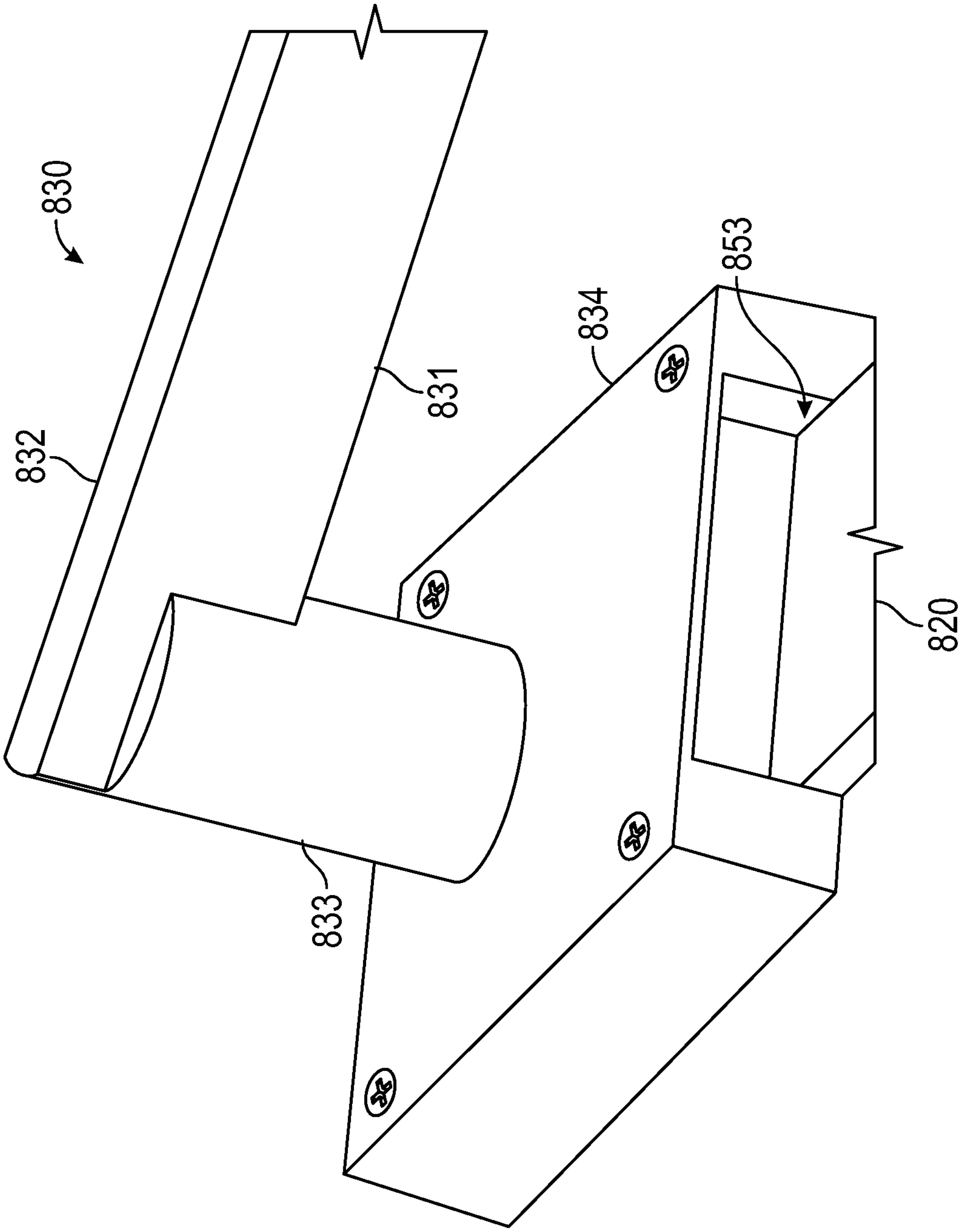
FIG. 12 is a schematic graphical representation of an example door handle assembly, included as part of the system of FIG. 8, according to various embodiments.

FIGS. 10 and 11 are exploded views of schematic graphical representations of the foot pedal assembly 810. FIG. 10 is a view of the foot pedal assembly 810 in the closed position or state, and FIG. 11 is a view of the foot pedal assembly 810 in the open position or state.

The foot pedal assembly 810 comprises a foot pedal 812, L-shaped component 814 (sometimes referred to as a kick-and-pull component or a bracket), and an actuator assembly 815 (also referred to herein as an actuating mechanism). In the illustrative examples herein, the foot pedal comprises a knurled surface 804 on which the user's foot interacts. In another example, the foot pedal 812 may have other textured surfaces on which the user's foot interacts. As another example, the foot pedal 812 may comprise a padding covered by a fabric or leather material. In yet another example, the foot pedal 812 may have a flat surface without texture or fabric.

The actuator assembly 815, in the illustrative example, includes a plurality of linkages configured to convert rotational force from foot operation of the foot pedal 812 into a translational force applied to arm member 820. The plurality of linkages comprises an elongated linkage member 816 (sometimes referred to herein as a second linkage) having a first end 808 that rotatably connects to the foot pedal 812 via a pivot rod or spindle at a lower end (e.g., at a first pivot point) and a second end connected to a link attachment component 818 (sometimes referred to herein as a first linkage) physically coupled to a lower end of the arm member 820. The link attachment component 818 may be attached to the arm member 820 via one or more fastener components (e.g., bolts, screws, rivets, etc.). In some embodiments, the link attachment component 818 may comprise a seat on a side of the link component opposite the foot pedal 812 configured to receive the lower end of the arm member 820 and fastener components installed via the side facing the foot pedal 812 (as shown in FIGS. 10 and 11). In another embodiment, the seat may be on a side of the link attachment component 818 facing the foot pedal 812 and fastener components installed from the opposite side. The link attachment component 818 may be rotatably coupled to the linkage member 816 via a pivot spindle or rod (e.g., at a third pivot point). The foot pedal 812 may be rotatably coupled to an upper end of the L-shaped component 814 at a pivot spindle or rod 806 (e.g., at a second pivot point). The various pivot spindles or rods forming the pivots may be similarly constructed to facilitate rotational movement about a corresponding axis through each pivot spindle or rod at each pivot point. In some embodiments, pivot rods or spindles may be replaced or used in combination with bearings or other mechanism that facilitates rotational movement between two bodies about an axis.

The L-shaped component 814 may include a first (vertical) planar member 811 arranged to face the door and a second (horizontal) planar member 813 extending from a bottom end of the first planar member 811 outward from the door. The first planar member 811 may be coupled to the door via fastener components. As used herein, fastener components may refer to any component that is able to attach one structure to another, such as but not limited to, bolts (as shown in FIG. 10), screws, nails, adhesive, suction cups, snaps, rivets, etc.

The L-shaped component 814 also comprises opening 803 extending down a central portion of the L-shaped component 814. The opening 803 has at least a first opening portion that extends from the upper end of the L-shaped component 814 toward the second planar member 813 and having a first width adapted to receive the arm member 820. For example, the first width may be larger than the arm member 820. In the illustrative examples of FIGS. 10 and 11, the opening 803 may also comprise an optional second opening portion extending from a bottom of the first opening portion toward the second planar member 813 and having a second width smaller than the first width. The second width may be smaller than the width of the arm member 820, and larger than the width of the linkage member 816. The second opening portion may be configured to receive the linkage member 816 when in the open state, for example, as shown in FIG. 11. Furthermore, in the closed state, according to some embodiments, the link attachment component 818 and/or the arm member 820 may contact the bottom edge of the first opening portion. Thus, the bottom edge of the first portion may operate as a stop for the vertical movement of the arm member 820 by the arm member 820 and/or link attachment component 818 butting up against the bottom edge.

The pivot rod 806 may be received by through-holes 801 of at the upper end of the first planar member 811 and through-holes 802 at the upper end of the foot pedal 812, thereby rotatably coupling the foot pedal 812 to the L-shaped component 814. The second planar member 813 may include a vertical protrusion 817 (also referred to as a lip structure) at an end opposite the first planar member 811 and configured to be engaged with by a user's foot to facilitate opening of the door through a pulling force applied, for example, by a toe and/or heel of the user's foot. That is, for example, after pressing the pedal 812 to disengage the latch of the handle, the user's foot may be engaged with the protrusion 817 to open the door using their foot. Thus, the user need not user their hands to operate the door handle or physically open the door. As another example, after pressing pedal 812 to disengage the latch, the user's foot may press on either foot pedal 812 and/or vertical protrusion 817 to open the door away from the user.

In some embodiments, the vertical protrusion 817 may optionally comprise a toothed structure 819 at an end of the protrusion 817 opposite the second planar member 813. The toothed structure 819 may be provided to increase grip of the user's foot with the protrusion 817. The increased grip ensures the user's foot is able to open the door without slipping off of the protrusion 817, which would result in closing the door. Other textured surfaces may be used in place of the toothed structure, for example, a knurled surface, textured surface, textured fabric or material, or the like.

Operation of the foot pedal 812 by an inward force applied by the user rotates the foot pedal 812 about an axis (e.g., the first pivot point) along the pivot rod 806 at the upper end of the foot pedal 812. The lower end of the foot pedal 812 pushes the end 808 of the elongated linkage member 816 toward the door about the second pivot point. The rotational pushing force applied to end 808 is translated to an upward force applied to the link attachment component

818 via the third pivot point by the second end of the linkage member 816 opposite the end 808. The link attachment component 818 then applies an upward translational force to the arm member 820, which translates this force as upward translational movement to the door handle assembly 130 to operate the door, as will be described in more detail below in connection with FIGS. 12-17. Furthermore, as the bottom end of the foot pedal 812 rotates toward the first planar member 811 due to operation of the foot pedal 812, the magnitude of the upward translational force applied by the linkage member 816 to linkage attachment component 818 increases as the linkage member 816 approaches a vertical configuration and the travel in the handle becomes less. Thus, a spring from a spring mechanism (described below) becomes stronger, but the leverage of the linkage member 816 and link attachment component 818 also increases to provide a smooth and efficient opening of the door.

In some embodiments, the foot pedal 812 may be returned to the first state from the second state by a spring mechanism that holds potential energy resulting from operation of the foot pedal 812. The spring mechanism releases the potential energy to push the foot pedal 812 back into the first state once released by the user. The lip of the L-shaped component 814 may operate to constrain the foot pedal in the first position.

In the illustrative examples shown in FIGS. 10 and 11, the spring mechanism may be implemented as one or more torsion springs 805 included in the foot pedal assembly 810. The torsion springs 805 may be configured to hold the foot pedal 812 in the first (closed) state and/or return the foot pedal 812 to the first state after operation and release by a user foot. For example, as shown in FIGS. 10 and 11, a torsion spring 805 may be disposed at the upper end of the foot pedal 812 and coupled to the L-shaped component 814 about the rotation axis (e.g., first pivot point) of the rotation rod 806. One end of the torsion spring 805 may be affixed to the L-shaped component 814 and another end of the torsion spring 805 may be positioned on a surface of the foot pedal 812 opposite the knurled surface 804. The other end of the torsion springs 805 may exert a force onto the foot pedal 812 to hold the foot pedal in the first (closed state). The torsion spring 805 may store energy due to operation of the foot pedal 812, and once the foot pedal is released, function to return the foot pedal 812 back to the first position. While a single torsion spring 805 is shown in the figures, embodiments herein are not so limited. In general, there may be any suitable number of torsion springs of the same or varying spring constants (e.g., 1, 2, 3, 4, 5, 6, 7, 8, or even more) as desired.

As another example, the spring mechanism may be a spring included as part of the existing door handle 832, which is configured to return the door handle to a closed/latched state. For example, after operation and the user enters the doorway releasing the foot pedal 812, the spring in the door handle releases built up potential energy that is translated down the arm member 820 to the foot pedal assembly 810, thereby returning the foot pedal 812 to the first position (e.g., FIG. 8).

In some embodiments, the spring mechanism may comprise one or more torsion springs 805, the spring in the door handle 832, or a combination thereof. In some embodiments, one or more torsion springs 805 may not be included, because the spring force in the door handle 832 may be adequate to ensure the foot pedal 812 returns to the first (closed) position.

Figure 18:
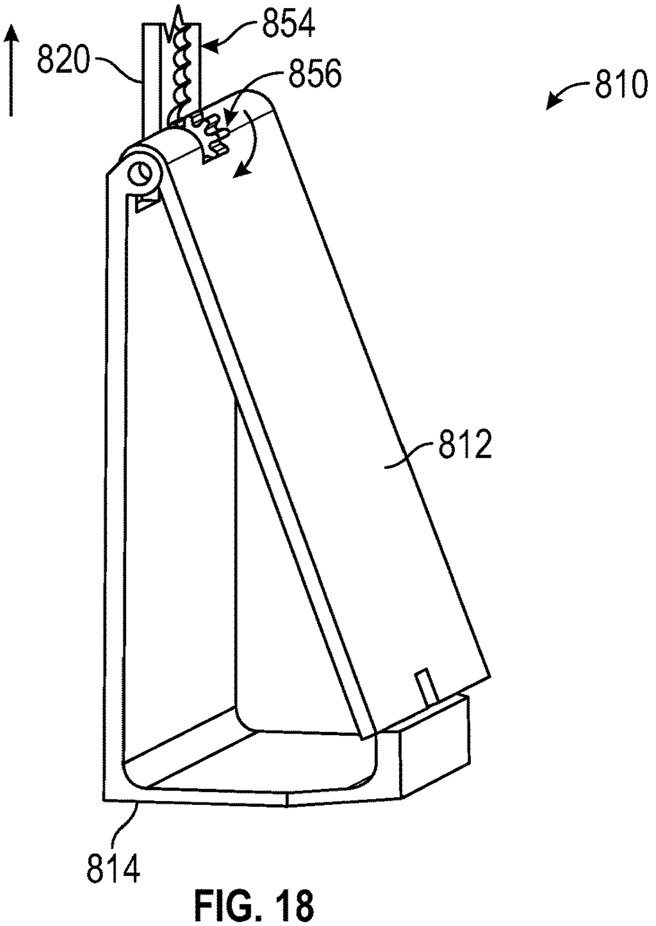
FIG. 18 is a schematic representation of another example foot pedal assembly according to various embodiments.

In some embodiments, the actuator assembly 815 may be implemented as a rack and pinion. For example, as shown in FIG. 18, the actuator assembly 815 may include a rack 854 that engages with a pinion 856. The pinion 856 may be aligned with the axis of rotation of the foot pedal 812 such that operation of the foot pedal 812 also causes rotation of the pinion 856. The pinion 856 may be stationary relative to the foot pedal 812 such that any movement thereon is translated to the pinion 856. The rack 854 may be positioned along the arm member 820 as illustrated.

FIGS. 12-17 are schematic graphical representations of the door handle assembly 830. With reference to FIGS. 12-17, the door handle assembly 830 includes a door handle 832 that interfaces with a housing (also referred to as a case or cover) 834. The door handle assembly 830 also includes a push-lock mechanism or assembly 835 (e.g., FIGS. 13-16) physically coupled to the arm member 820. For example, operation of the foot pedal 812 causes a signal (e.g., a force in this example) to be translated along arm member 820 that is applied to the push-lock assembly 835. The push-lock assembly 835 converts the translational force from arm member 820 to a rotational force that rotates the door handle 832, thereby disengaging the latch of the door handle from a door frame (not shown).

The door handle 832 may include a lever 831 for turning a spindle 846, housed in a spindle housing 833, configured to operate and disengage a latch (not shown) from a door frame (not shown). The door handle 832 also includes a mounting rose 842 attached to the door via mounting holes 852 configured to receive fastener components (e.g., screws holes, nail, holes, etc.) that covers and houses the internal components of the door handle 832. Door handle 832 may be any type of door knob, for example, a lever handle door knob as shown in FIGS. 13-20, a round or oval doorknob, etc. The illustrative examples herein at described in connection with a lever style door knob, but the embodiments herein will be equally applicable to any type of door knob known in the art.

In the illustrative example of FIGS. 12-17, the housing 834 may be positioned to receive and house the mounting rose 842. The housing 834 may comprise an opening 853 that receives the arm member 820. The push-lock assembly 835 may include a first component for receiving the signal from the arm member 820 and a second component interfaced with the first component and configured to convert the translational force from the arm to a rotational form applied to the door handle 832 (e.g., the lever 831 or spindle 846). For example, an end of the arm member 820 may be physically coupled to a plate 836 of the push-lock assembly 835, the plate 836 may be an example of the first component. In the illustrative example of FIGS. 13-15, the plate 836 comprises at least an elongated member 837 extending vertically from arm member 820 defining an opening 840. The plate 836 comprises at least one internal rack 844 along an vertical internal edge of elongated member 837 (as shown in FIG. 13-16). The internal rack 844 may also or alternatively be referred to as the first component of the push-lock assembly 835. In some embodiments, the plate 836 may include internal pinions (instead of rack 844) on one or more of the elongated members 839. In another embodiments, the opening 840 may include an internal gear. The length of the rack 844 should be at least long enough to accommodate full travel of the door handle 832.

In some embodiments, the plate 836 may also comprise an optional elongated member 839 extending vertically from the arm member 820 on a side of the pinion 838 opposite the elongated member 837. Elongated member 839 may act as a guide to keep the pinion 838 in contact with the rack 844. In one example, elongated member 837 may be longer than the elongated member 839. In another example, the member 837 and 839 may be the same length.

Figure 16:
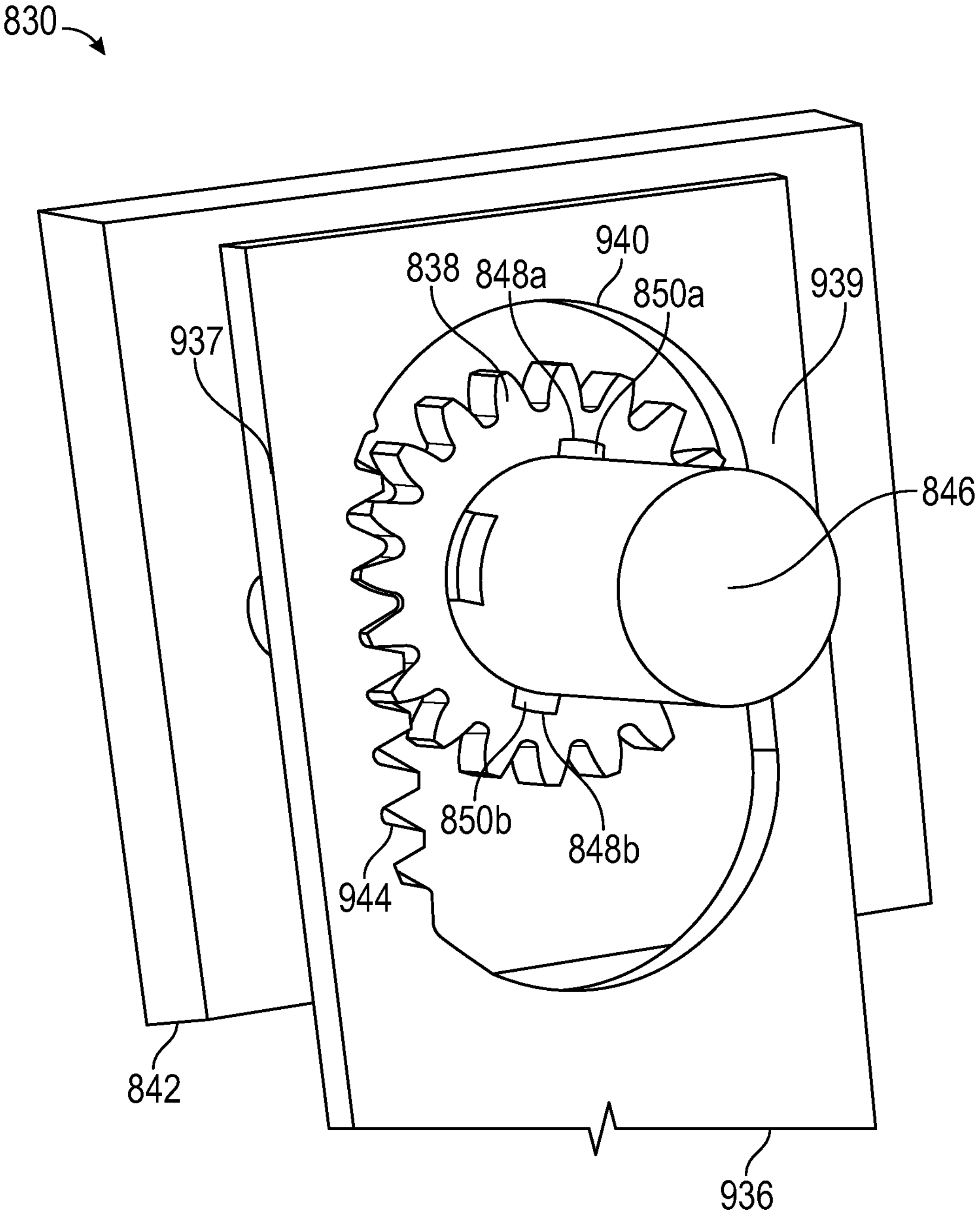
Figure 17:
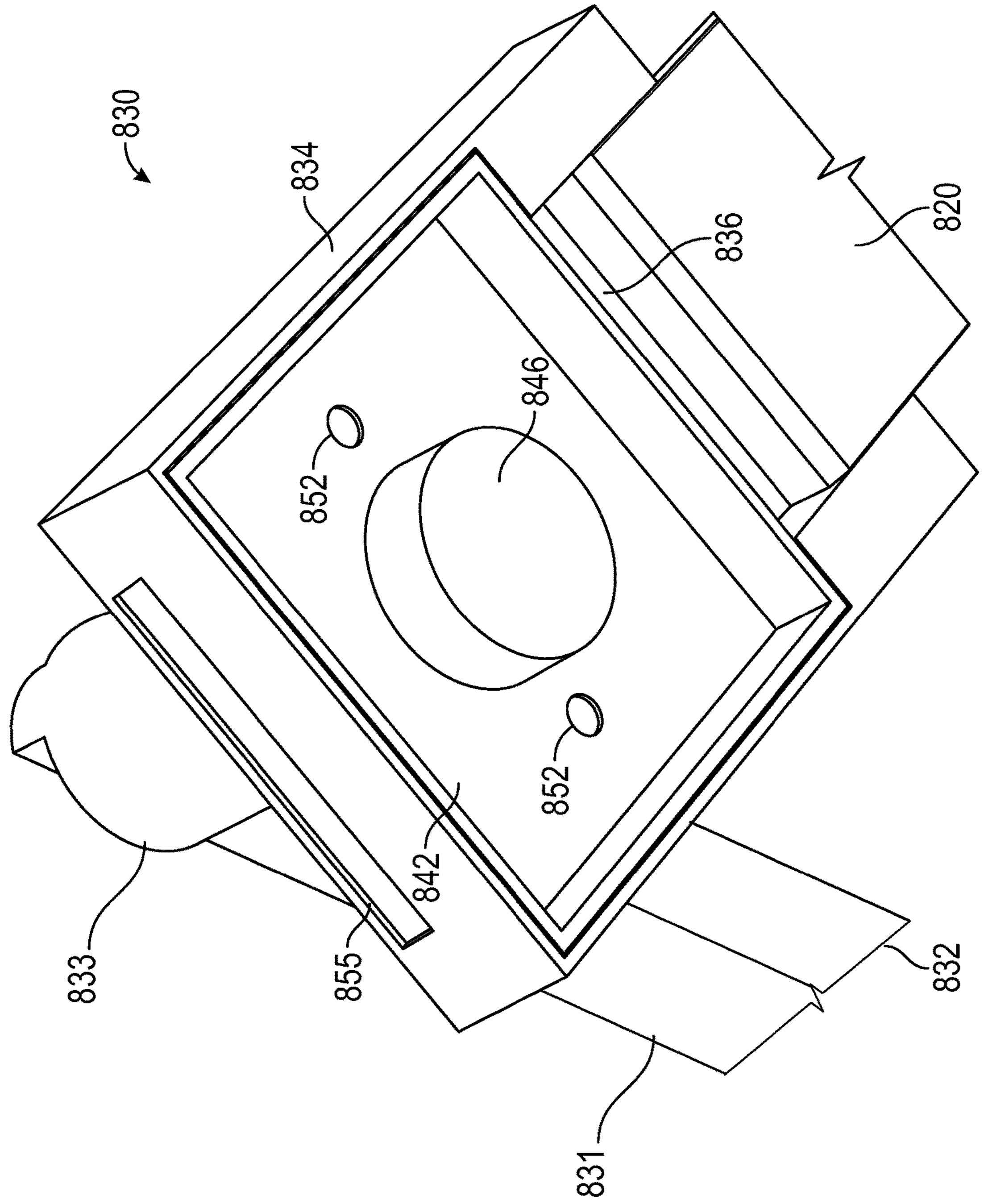
FIG. 17 is a schematic graphical representation of a back side view of the example door handle assembly of FIG. 12 according to various embodiments.

In another example, the opening may be an oval or stadium shaped opening, for example, opening 940 of plate 936 of FIG. 16. In this implementation, the opening comprises elongated members 939 and 937 having rack 944, which are similar to elongated members 839 and 837 except for as shown in FIG. 16. Furthermore, the opening 940 need not be ovular in shape, and may be circular, rectangular, rounded, etc.

The push-lock assembly 835 may also include a pinion 838 (or other type of gear) (e.g., the second component) that can interface or otherwise engage with the rack 844. The pinion 838 may be physically coupled to and interlocked with the door handle 832. Thus, a translational force applied to the arm member 820 causes the plate 836 to move in the same direction, which rotates the pinion 838 via the internal rack 844 and turns the door handle 832.

Figure 15:
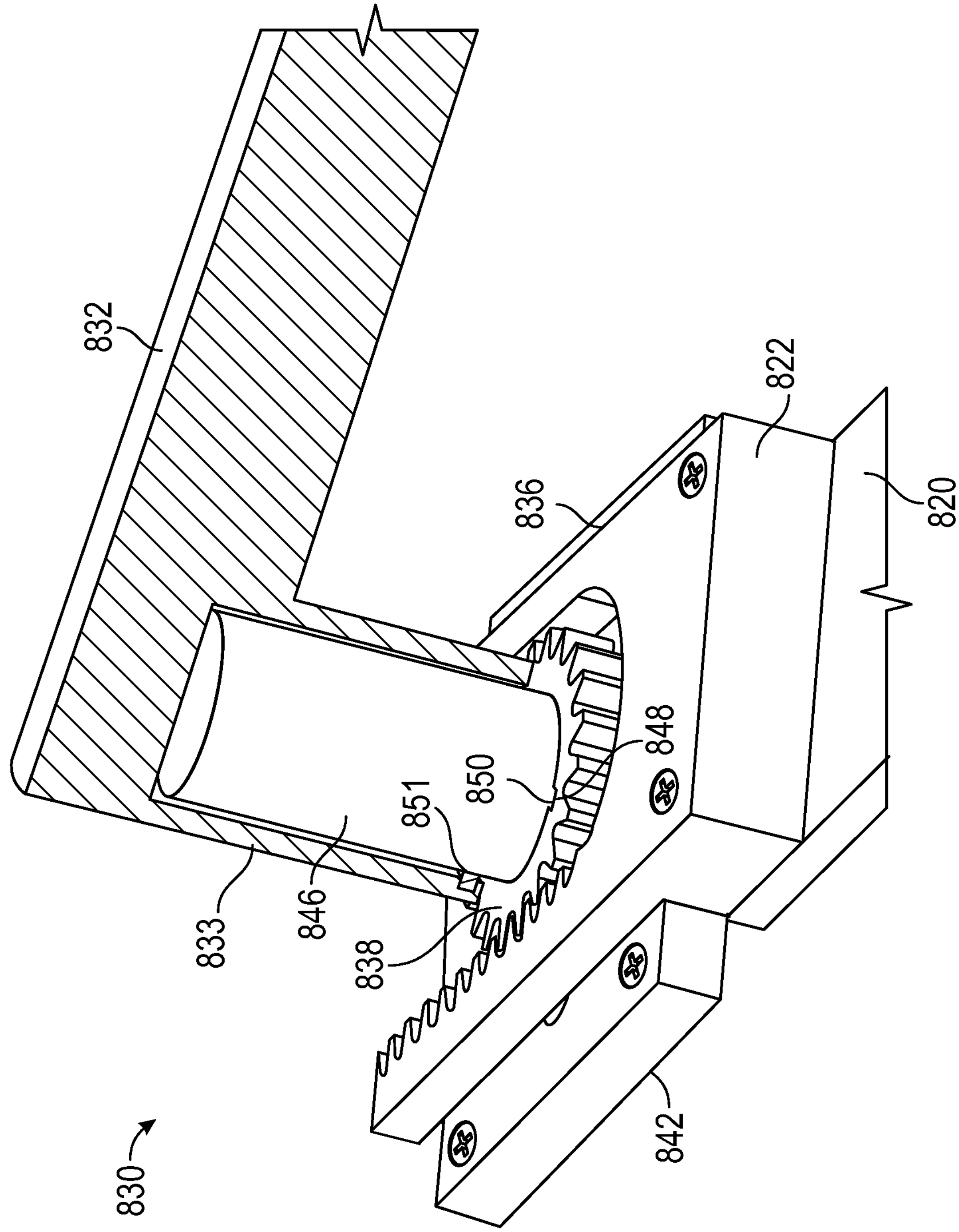

In some embodiments, the plate 836 may include a protrusion 822 that couples the plate 836 to the arm member 820 via fastener components, for example, as shown in FIG. 15. In another example, the arm member 820 may include a protrusion that couples to the plate 836 and the plate is substantially planar. Either protrusion may operate as a stop for the vertical movement of the plate by butting up against the mounting rose 842. In another embodiment, arm member 820 may be provided with a thickness such that the surface of the arm member 820 contacts the plate 836, without protrusion 822.

Figure 13:
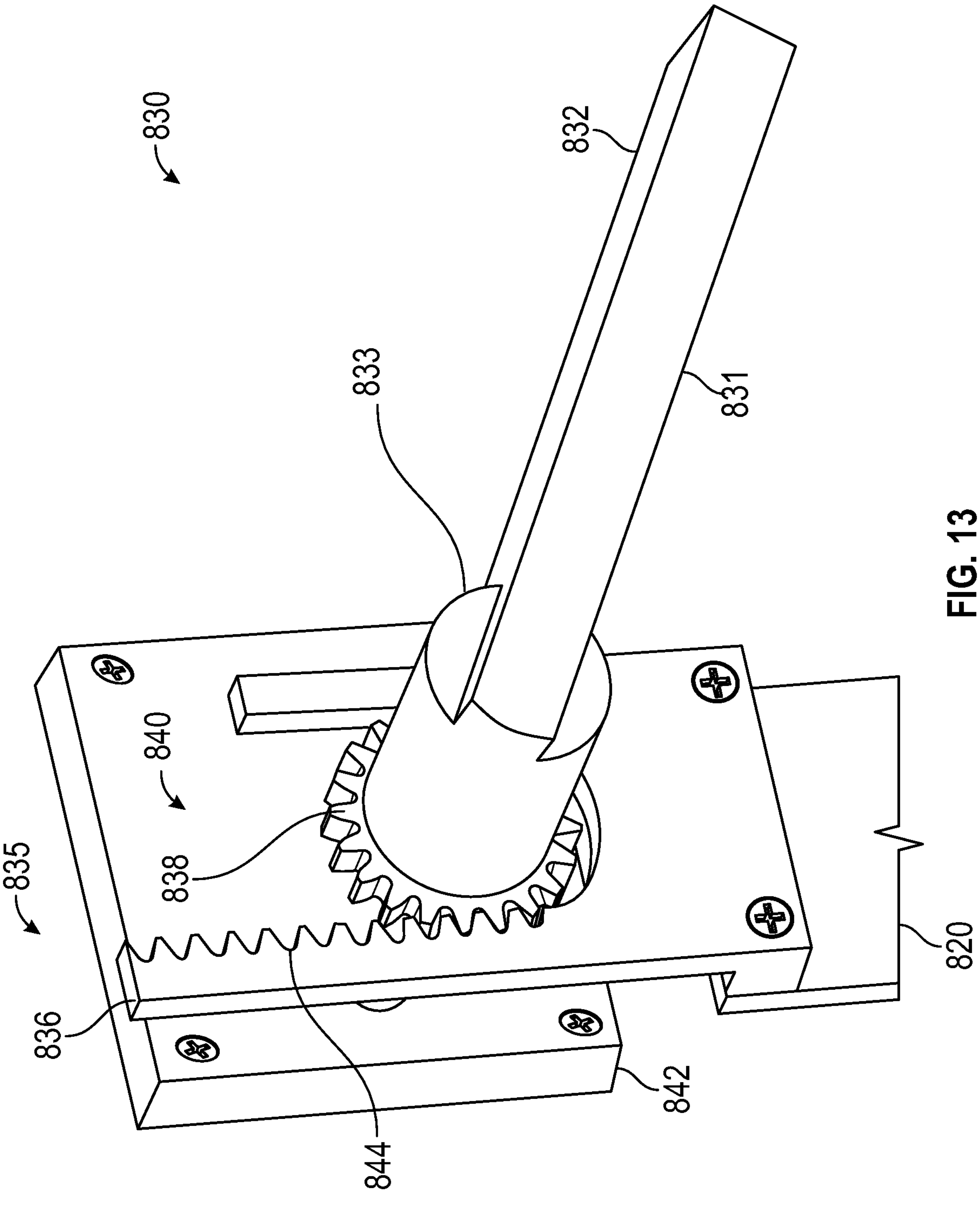
FIGS. 13-16 are a schematic graphical representation of internal components of the example door handle assembly of FIG. 12, with a housing removed, according to various embodiments.

For example, when the foot pedal is in the first state (e.g., as shown in FIGS. 8 and 10), the pinion 838 can be positioned at a first (closed) position within the opening 840 (e.g., the pinion 838 is located at approximately the middle of the rack 844) and the door handle 832 is in a closed or latched position, as shown in FIG. 8. Operation of the foot pedal 812 to the second state causes the rack 844 to move in a vertical/upward direction and the rack 844 turns the pinion 838, which is translated to the handle 832 via interlocking of the pinion 838 with the spindle 846 (FIGS. 15 and 16). When the foot pedal is in the second state (e.g., as shown in FIGS. 9 and 11), the pinion 838 is positioned at a second position of the opening 840 (e.g., a lower portion of the opening 840), as shown in FIG. 13, and the door handle 832 is in an open or unlatched position, as shown in FIG. 9. Releasing the foot pedal 812 releases the force applied to arm member 820 and plate 836 to moves in a vertical/downward direction. The rack 844 turns the pinion 838 and the door handle 832 returns to the closed or latched position.

In some embodiments, a portion of the plate 836 may be exposed from the housing 834 via opening 855, as shown in FIG. 9. For example, when the foot pedal 812 is in the second state, an upper portion of the plate 836 may be positioned above the mounting rose 842 (FIG. 13) and/or above the housing 834 (FIG. 9). As shown in FIG. 8, in the first state, the plate 836 may be completely housed within the housing 834. In some embodiments, the plate 836 need not be exposed and may be completely housing by the housing in both states, for example by constructing a housing 834 large enough to house all internal components in any state.

Openings 853 at the bottom side of the housing 834 (e.g., FIG. 12) and opening 855 form a guide or channel into which the arm member 820 may be received and guide the plate 836 up and down in the vertical direction while holding the plate 836 (and therefore the rack 844) in place in the other non-vertical directions (e.g., horizontally stationary). For example, a channel between openings 855 and 853 may comprise side walls formed within the housing 834 that receives an upper end of arm member 820 and a plate 836. During operation, the upper end of arm member 820 and plate 836 may be moved (e.g., sliding or other translational movement) in the vertical direction within the channel, while side walls of the channel restrain the arm member 820 and plate 836 from non-vertical translation movements.

Figure 14:
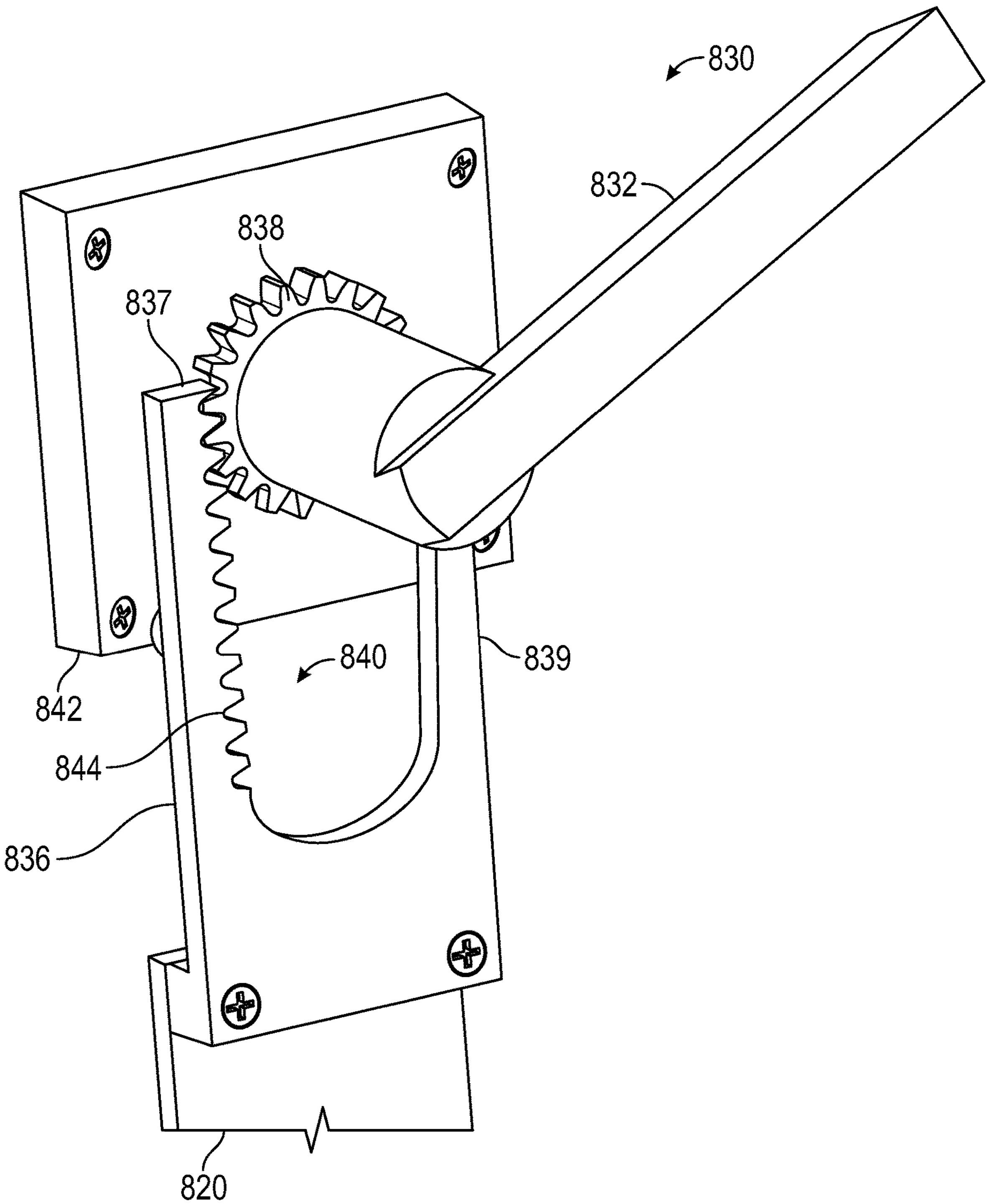

Embodiments herein may also permit normal operation of the door handle 832 via a user hand operating lever 831. For example, a user may operate the lever 831 by applying a downward force on the handle. The downward force rotates the spindle 846 which is translated to pinion 838. Rotation of pinion 838 causes upward translational movement of the plate 836 via the rack 844, which pulls on the arm member 820 and moves the foot pedal 812 into the second state. As another example, a user may apply an upward force to the lever 831, rotates the spindle 846 which is translated to pinion 838. Rotation of pinion 838 causes downward translational movement of the plate 836 via the rack 844, such that the pinion 838 is located at a third position of the opening 840 (e.g., at an upper portion of the opening as shown in FIG. 14). The translation movement of the plate 836 applies a downward translational force on the arm member 820, which is translated to the link attachment component 818. The link attachment component 818 transfers the downward translational force to the linkage member 816, and an outward force is applied to the foot pedal 812. However, due to the configuration of linkage member 816 with to the link attachment component 818 and consequently arm member 820 (as described above), the magnitude of travel of the foot pedal 812 in accordance with the orientation of the linkage member 816 relative to the rest of system 800. That is, a proportion of the amount of the travel of the foot pedal 812 to an amount of translational movement in the linkage member 816 increases when the translation movement is in the upward direction and decreases when the translational movement is in the downward direction. For example, when transitioning from the first (closed) state to the second (open) state, the linkage member 816 approaches a vertical orientation (FIG. 11), which applies the upward translational movement to the arm member 820. The proportion of the amount of rotational in the foot pedal 812 to the amount of travel in the linkage member 816 (e.g. translational movement) increases as the linkage member 816 becomes vertical. Whereas, as the linkage member 816 approaches a horizontal orientation, the proportion of rotational movement in the foot pedal 812 to the translational movement in the linkage member 816 decreases accordingly.

In another example where the rack 844 is positioned on, for example, the elongated member 839 (e.g., the opposite side of opening 840), the directions of travel are reversed. For example, operation of the foot pedal 812 (e.g., pressing inward) results in upward movement of the plate 836. Upward travel of plate 836 is translated by interaction between the rack on elongated member 839 and pinion 838 to cause the door handle 832 to rotate in an upward direction.

FIGS. 15 and 16 illustrate an example approach for interlocking the pinion 838 with the spindle 846. FIG. 15 illustrates the system for handless operation of the door with the housing 834 removed and a cross sectional view of the door handle 832, so to illustrate the interlocking of the pinion 838 to the spindle 846. The door handle 832 may be coupled to the spindle 846 via a interfacing member 851. FIG. 16 illustrates the system with the housing 834 and the door handle 832 are removed.

In the illustrative example, the door handle 832 may comprise a collar that surrounds the spindle 846. The collar can include one or more notches 850 (e.g., two notches 850*a* and 850*b* of FIG. 16, collectively referred to as notches 850). The pinion 838 may (or other component configured to translate the translation force to a rotational force) may include one or more recesses 848 (e.g., two recess 848*a* and 848*b* of FIG. 16, collectively referred to as recess 848) shaped to receive the notches 850, thereby physically coupling the pinion 838 to the spindle 846. The collar with notches 850 may be included as a part of the door handle 832 or may be an additional component that can be added to the door handle 832.

In some implementations of door handles 832, the spindle 846 may be affixed to the collar and the notches may be configured to engage with the lever 831 via locking member 851, such that a rotational force may applied to the spindle 846 via the notches 850 and operates the internal components to disengage the latch. Various embodiments of the door handle assembly 830 disclosed herein take advantage of the existing components of the door handle 832 to operate the latch. For example, the pinion 838 is shaped, as described above, to engage with the existing notch 850 (e.g., as provided as an original, unaltered component of door handle 832). In some embodiments, this may be achieved by removing (e.g., grinding, cutting, etc.) at least a portion of the spindle housing 833 that engages with the notches to provide space for the pinion 838. In another example, the spindle housing 833 need not be cut and may be pulled back from the notches 850 to permit the pinion 838 to be installed therein. In various embodiments, the recesses 848 may extend to less than the full extent of the notches, thereby leaving a portion of the notch to engage with the lever and permit use of the lever as well as the door handle assembly 830 as described herein. In another example, the pinion 838 may comprise additional notches (not shown) configured to engage with the spindle housing 833 and operate in a manner substantively similar to notches 850, that pinion 838 may include notches that are used in place of notches 850. The notches on pinion 838 may be positioned over recess 848 such that the orientation of the lever is unchanged or may be positioned elsewhere about the spindle 846.

While notches and recesses are described herein for coupling the second component to the push-lock assembly 835 to the door handle 832, other methods may be equally applicable. For example, the second component may be affixed to the door handle 832 by an adhesive, threaded assembly, screws, fasteners, etc. Furthermore, various components disclosed herein are described as coupled or physically coupled to each other. Physical coupling may be done using any means known in the art, for example, screws, nails, adhesive, rivets, dowels, etc. Rotational movement may be achieved, for example at the upper end of foot pedal 812 by bearings, sliding interfaces, rods, lubrication, etc.

The components disclosed herein may be made of any material as desired by the particular application. For example, one or more of the parts may be made of metal (e.g., zinc, steel, aluminum, etc.), plastic, carbon fiber, etc. Any material may be used to form the parts, such that operation of the foot pedal 812 is translated to the handle 832 so to operate the latch. For example, the arm member 820, L-Shaped component 814, and/or foot pedal 812 may be made of metal (e.g., aluminum or the like) or plastic materials. In the case of metal, the arm member 820 may be powder coated to avoid damage to the door. The pivot rods (e.g., pivot rod 806) may be made of metal having a strength to withstanding rotation forces, such as, for example, steel or stainless steel. According to various embodiments, the link attachment component 818, linkage member 816, and/or plate 836 may be made from a lubricious plastic material, such as, but not limited to, acetal resins (e.g., Delrin® produced and sold by DuPont™). The pinion 838 may be formed for plastic or metal materials common to pinions and gears. According to various embodiments, the housing 834 may also be made of metal, such as die cast zine, similar to most door handle or door knob parts.

In some embodiments, the arm member 820, linkage member 816 and plate 836 may be a singular, integral body. That is, these three components maybe fabricated as a single unit out of, for example, plastic, die casting, 3D printing or the like. Production as a single unit may reduce manufacturing costs.

Figure 19:
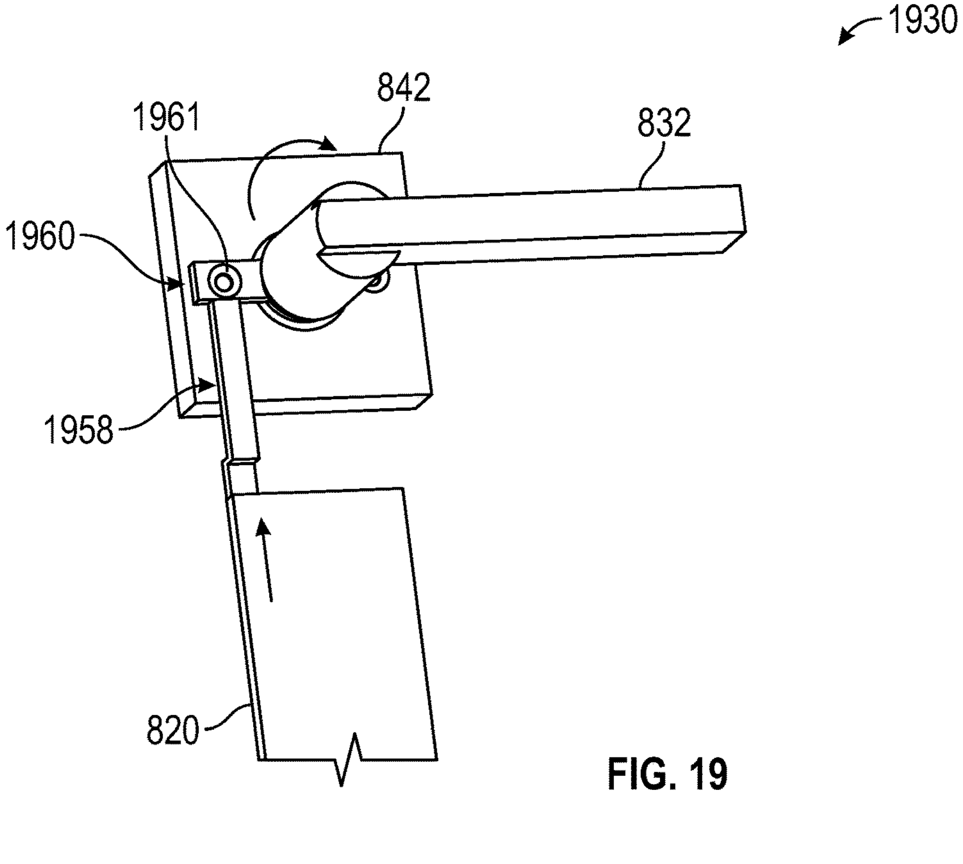
FIG. 19 is a schematic representation of an example door handle assembly according to various embodiments.

FIG. 19 illustrates another example door handle assembly 1930. The door handle assembly 1930 is substantially similar to the door handle assembly 830, except for the arm member 820 is coupled to an extension part 1958 that is connected to a lever 1960, for example, via bearing 1961 or another rotational element. The lever 1960 is coupled to the spindle 846, for example, in a manner similar to that described in connection to FIGS. 15 and 16. Thus, movement of the arm member 820 causes the lever 1960 to rotate via bearing 1961 and operates the door handle 832 in a manner similar to that described in connection to FIGS. 8-17.

Figure 20:
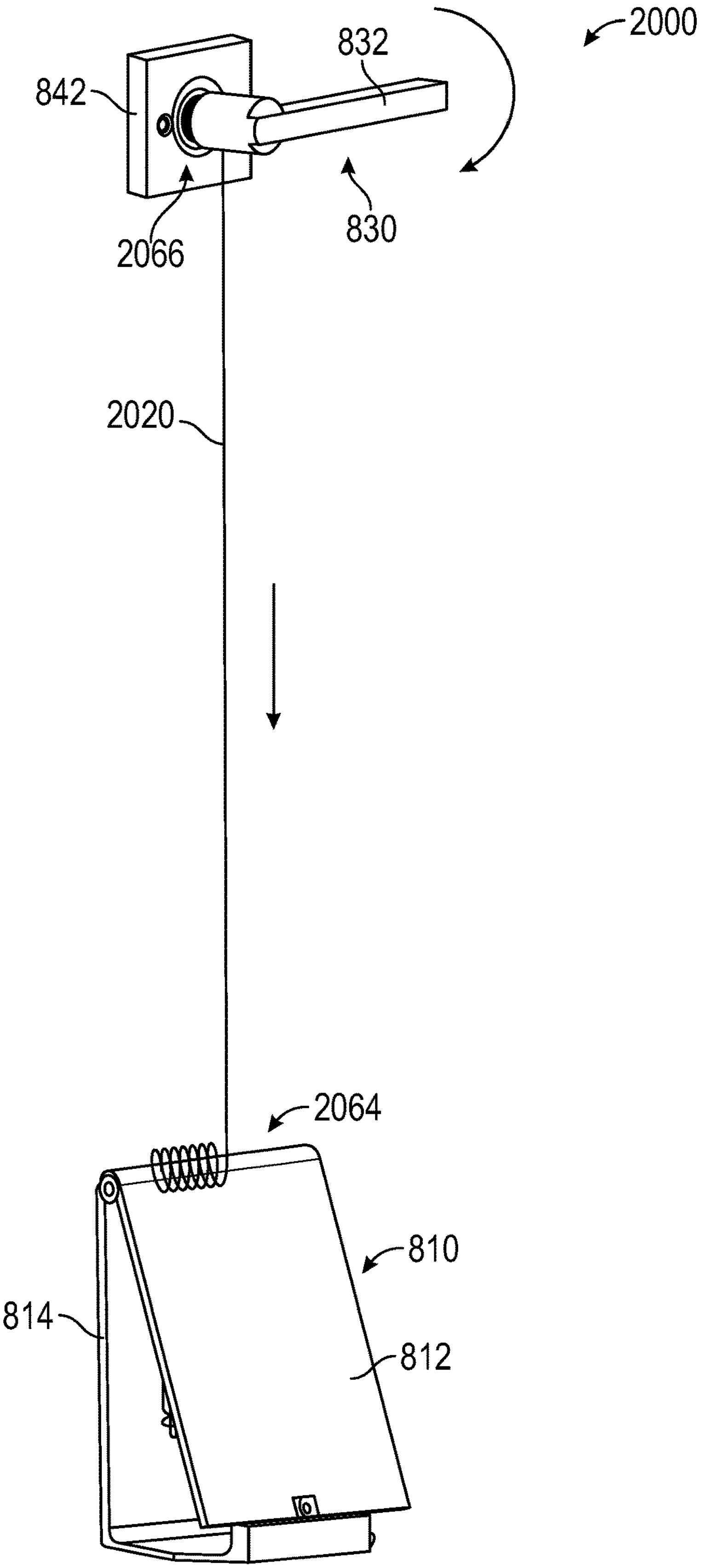
FIG. 20 is a schematic representation of another example of hands free door operation of a door according to various embodiments.

FIG. 20 illustrates another example system 2000 for handless operation of a door. The system 2000 is substantially similar to the systems disclosed herein. However, the arm member 820 is replaced with a cable 2020 that is wound about the rotation axis of the foot pedal 812 at winding 2064 and is also wound about the spindle 846 at winding 2066. Each end of the cable is affixed to the foot pedal 812 and spindle 846, respectively. Operation of the foot pedal 812 causes the cable to be further wound about winding 2064 and pulls on winding 2066, thereby operating door handle 832. A spring mechanism may be utilized, upon release of the foot pedal 812, to return the winding 2066 back to the closed position.

Actuator assembly 815 and/or push-lock assembly 835 may include any actuators. For example, while mechanical actuation is described herein, the assemblies may include, one or more of mechanical, electrical, electro-mechanical, pneumatic, hydraulic, etc. to accomplish movement of the various assemblies.

Figure 21:
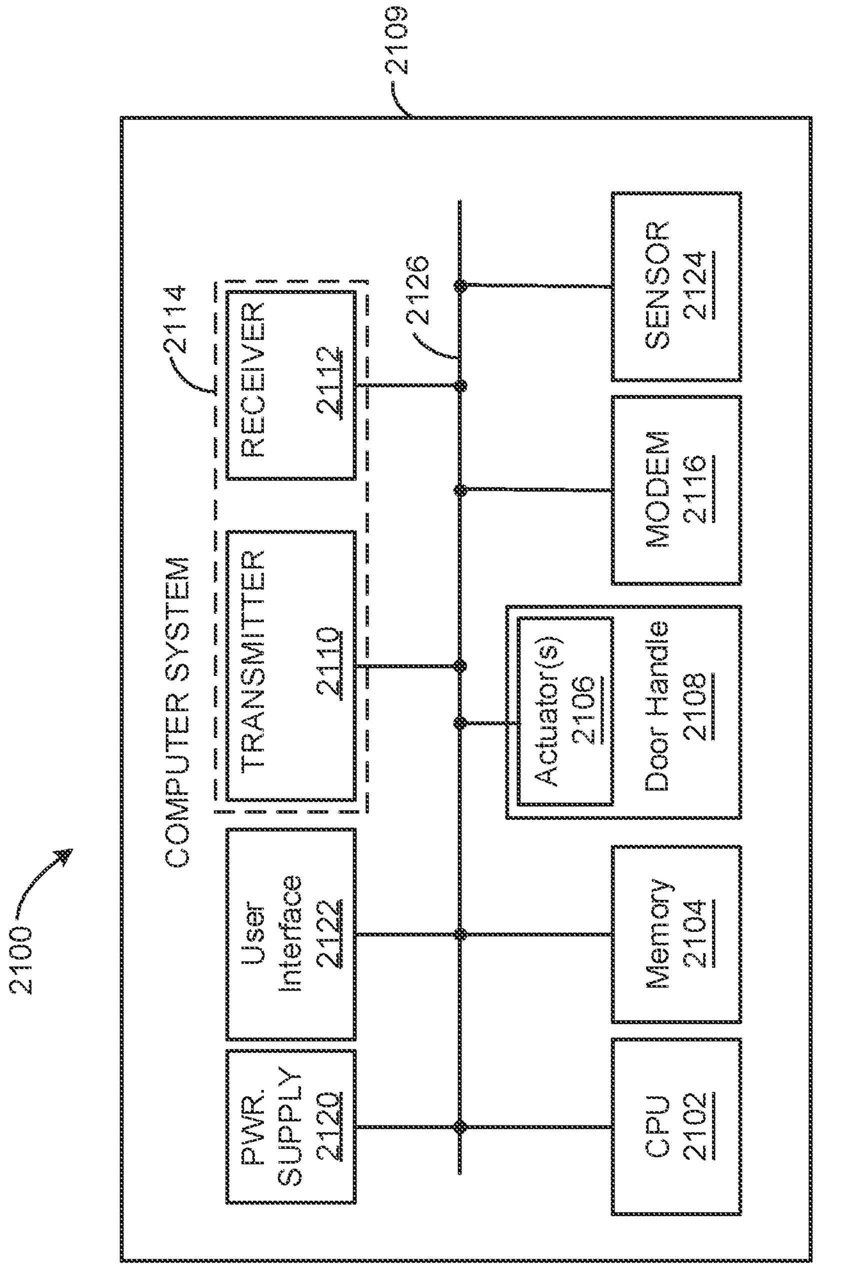
FIG. 21 is a functional block diagram of the computing device that can be implemented with the with one or more of the embodiments disclosed here.

FIG. 21 is a functional block diagram of the wired or wireless computing system 2100 (also referred to herein as a processing system) that can be implemented with the systems disclosed herein, for example, at least the system of FIG. 5. The computing system 2100 may be included and/or communicably coupled to the foot pedal assembly and/or the door handle assembly according to the embodiments disclosed herein. In some embodiments, both assembly's may be coupled to the same or a different computing system 2100.

The system 2100 can include one or more processor units (processor) 2102. The processor 2102 can controls operation of the system 2100. The processor 2102 can also be referred to as a central processing unit (CPU). The processor 2102 can include multiple processors or microprocessors as needed. Processor 2102 can perform all the functions required to allow the systems to perform according to programmable instructions, user interaction, for example, automated operation of the door. The processor 2102 can include or be a component of a processing system implemented with one or more processors 2102. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The system 2100 can also have a memory 2104 coupled to the processor 2102. The memory 2104 can include both read-only memory (ROM) and random access memory (RAM). The memory 2104 can provide instructions and data to the processor 2102. At least a portion of the memory 2104 can also include non-volatile random access memory (NVRAM). The processor 2102 can perform logical and arithmetic operations based on program instructions stored within the memory 2104. In some implementations, the memory 2104 can store multiple programs, for example, operation of the door based on received signals.

The processing system and the memory 2104 can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The system 2100 can have a plurality of actuators 2106 that can control the foot pedal assembly and/or door handle assembly. The actuators 2106 can be communicatively coupled to the processor 2102. The processor 2102 can execute instructions contained in the memory 2104 to command movement of one or more of the plurality of actuators 2106 to operate the door. The actuators 2106 can be mechanical, electrical, electro-mechanical, pneumatic, hydraulic, etc. to accomplish movement of the various assemblies.

The system 2100 can also include a transmitter 2110 and/or a receiver 2112 to allow transmission and reception of data between the components of system 2100 (e.g., between the foot pedal assembly and the handle assembly) and/or and a remote location. The transmitter 2110 and the receiver 2112 can be combined into a transceiver 2110. The system 2100 can also include (not shown) multiple transmitters, multiple receivers, multiple transceivers, and/or multiple antennas as needed for various communication standards via wireless or wireline communications. The system 2100 can further have a modem 2116 coupled to the transmitter 2110, the receiver 2112, or the transceiver 2114. The modem 2116 can perform modulation demodulation tasks for communication with an external network, for example. In some implementations the processor 2102 can communicate via the transmitter 2110, the receiver 2112, and/or the transceiver 2114 via the Internet. In some embodiments, the transmitter 2110 and the receiver 2112 can be configured to transmit and receive information via other wired or wireline systems or means.

The system 2100 can have a user interface 2122. The user interface 2122 can include one or more controls allowing user interaction by the user. For example, user interface 2122 can include one or more of the foot pedal, door handle, input devices, speakers, and/or microphones to provide means for interaction with the system. A user can interact with the user interface 2122 to operate the door.

The system 2100 can further include a sensor 2124 for detecting the presence of a user. For example, the sensor 2124 can include one or more of motion sensors, pressure sensors, photoelectric sensors, thermal sensors, radar technology, object recognition from imaging devices such as cameras, infrared detectors, acoustic sensors, vibration sensors, etc. The sensor 2124 may be the sensor 525 of FIG. 5.

The system 2100 can further have a power supply 2120. The power supply 2120 can provide power to the system either via power backbone (e.g., AC power) or via battery.

The various components of the system 2100 can be coupled together by a bus system 2126. The bus system 2126 can include a data bus, for example, as well as a power bus, a control signal bus, and a status signal bus in addition to the data bus. The components of the system 2100 can be coupled together or accept or provide inputs to each other using some other mechanism.

The various components of the system 2100 can be enclosed by a housing 2109. The housing 2109 can be the housing 220 and/or 834 and/or the mounting rose 842.

Although a number of separate components are illustrated in FIG. 21, one or more of the components can be combined or commonly implemented.

The hardware used to implement the various illustrative logics, logical blocks, and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Thus, the claims are not intended to be limited to the aspects shown herein, but is to be accorded the full scope consistent with the language claims, wherein reference to an element in the singular is not intended to mean "one and only one" unless specifically so stated, but rather "one or more."

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A system for hands free operation of a door, the system comprising:
- an arm member having an upper end and a lower end;
- a foot pedal assembly disposed and operably connected at the lower end of the arm member; and
- a door handle operating assembly disposed and operably connected at the upper end of the arm member, the door handle operating assembly comprising:
  - a pinion configured to attach to a spindle of a door handle external to a mounting rose of the door handle,
  - a plate coupled to the upper end of the arm member, the plate having:
    - a first surface that is approximately parallel to a direction between the upper end and lower end of the arm member,
    - a second surface opposite the first surface, and
    - an opening extending from the first surface to the second surface, the opening providing a side surface between the first and second surfaces, and
  - a rack disposed on the side surface of the opening of the plate and configured to engage with the pinion, and
  - wherein operation of the foot pedal applies a translational movement to the plate via the arm member, and the rack and pinion translate the translational movement applied to the plate to a rotational movement that rotates the spindle and operates the door handle, and
- wherein the door handle operating assembly permits both normal operation of the door handle via a user turning the door handle and operation of the door handle, or operation of a locking mechanism of the door, via use of the foot pedal handle via a user turning the door handle.

2. The system of claim 1, wherein the foot pedal assembly comprises:
- a first planar member having an upper end connected the lower end of the arm member,
- a foot pedal rotatably coupled to the upper end of the first planar member at an upper end of the foot pedal,
- a second linkage disposed at the lower end of the arm member, and
- a first linkage having a first end rotatably coupled to a lower end of the foot pedal and a second end rotatably coupled to the second linkage.

3. The system of claim 2, wherein the foot pedal comprises a surface having a knurl pattern configured to provide grip between the surface and a foot of a user.

4. The system of claim 1, wherein the foot pedal assembly comprises an L-shaped component, the L-shaped component comprising a first planar member, a second planar member extending from a lower end of the first planar member approximately perpendicular to the first planar member, and a protrusion extending vertically from an end of the second planar member opposite the first planar member, wherein the protrusion is configured to engage with a foot of a user to facilitate applying a pulling or pushing force to the L-shaped component by a foot of a user.

5. The system of claim 4, wherein the protrusion comprises a toothed surface configured to provide grip between the protrusion and the foot of a user.

6. A foot pedal apparatus for operating a door handle assembly for hands free operation of a door, the foot pedal apparatus comprising:
- a bracket configured to be disposed at a lower region of a door, the bracket comprising:
  - a first planar member, and
  - a second planar member extending approximately perpendicular, a foot pedal operably rotatable connected the first planar; and
- an elongated arm member, the arm member extending from a first end of the arm member, which is operably connected to the first planar member and the foot pedal, and to a second end of the arm member, where the arm member extends in a direction away from and approximately parallel to the first planar member;
- a door operating assembly at and operably connected to the second end of the arm member, the door handle operating assembly comprising:
  - a pinion configured to attach to a spindle of a door handle at a position external to a mounting rose of the door handle,
  - a plate coupled to the second end of the arm member, the plate having an opening configured to receive the spindle of the door handle, the opening comprising a rack extending in the direction and configured to engage with the pinion, and
- wherein a force applied to the bracket exerts translational movement to the plate via the arm member, and the rack and pinion translate the translational movement on the plate to a rotational movement that rotates the spindle and operates the door handle, and wherein the door handle operating assembly permits both normal operation of the door handle via a user operating the door handle and operation of the door handle, or operation of a locking mechanism of the door, via use of the foot pedal.

7. The foot pedal apparatus of claim 6, further comprising a foot pedal rotatably coupled to the first planar member at a first pivot point and extending from the first pivot point toward the second planar member, wherein the foot pedal comprises a surface having a knurl pattern configured to provide grip between the surface and a foot of a user.

8. The foot pedal apparatus of claim 6, further comprising a protrusion extending from an end of the second planar member opposite the first planar member, wherein the protrusion is configured to engage with a foot of a user to facilitate applying a pulling or pushing force to the bracket by a foot of a user.

9. The foot pedal apparatus of claim 8, wherein the protrusion comprises a toothed surface configured to provide grip between the protrusion and the foot of a user.

10. A system for hands free operation of a door, the system comprising:

a foot pedal assembly configured to be disposed at a bottom edge of the door, the foot pedal assembly configured to generate a translational force via mechanical linkage responsive to operating the foot pedal assembly by a user; and a door operating assembly comprising:

a pinion configured to attach to a spindle of a door handle external to a mounting rose of the door handle, and a plate having a first surface, a second surface opposite the first surface, and an opening extending from the first surface to the second surface, the plate comprising a rack disposed on a side surface between the first and second surfaces, the rack configured to engage with the pinion, wherein the door operating assembly is configured to receive the translational force from the foot pedal assembly via the mechanical linkage and apply the translational force to the plate, and wherein the rack and pinion translate the translational force on the plate to a rotational movement configured to rotate the spindle and operate the door handle, and wherein the door operating assembly permits both normal operation of the door handle via a user operating the door handle and operation of the door handle, or operation of a locking mechanism of the door, via use of the foot pedal.

11. The system of claim 10, further comprising an arm member connected having a lower end coupled to the foot pedal assembly and an upper end coupled to the plate of the door operating assembly, wherein the translational force is transmitted to the plate via the arm member.

12. The system of claim 1, wherein normal operation of the door comprises applying a second rotational movement that rotates the spindle responsive to turning the door handle, the second rotational movement being in an opposite direction of the rotational movement, and wherein the rack and pinion translate the second rotation movement to a second translational movement.

13. The system of claim 12, wherein the second rotation movement is applied to the foot pedal via the arm member, and wherein the second rotation movement is in a direction opposite of the translational movement.

* * * * *